April 15, 1952     A. J. KAYSER     2,592,645
MEANS FOR SEALING FLUID LUBRICANT
IN THE HUB OF A ROTATING ELEMENT
Filed June 2, 1950
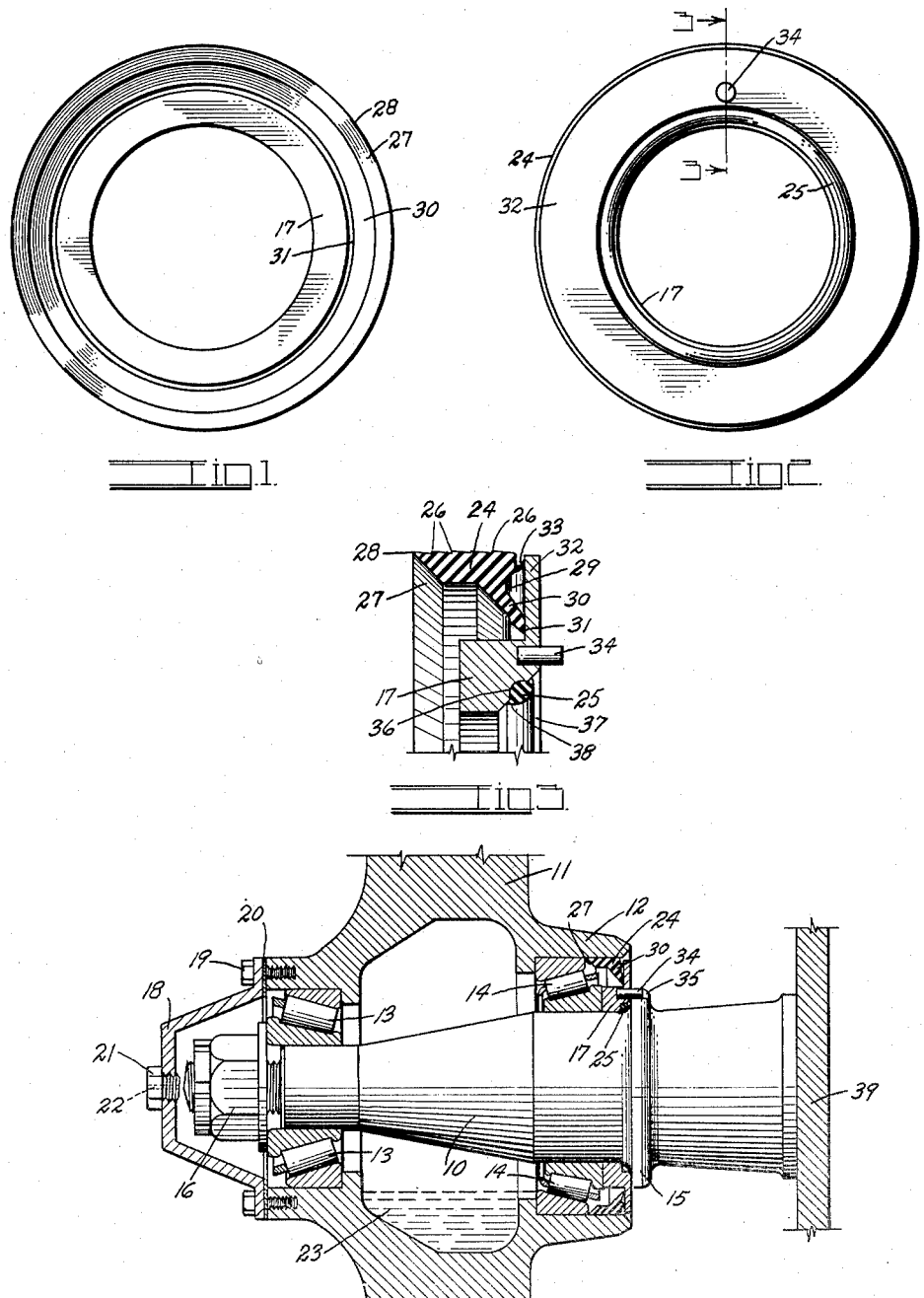
INVENTOR.
ALLAN J. KAYSER
BY
ATTORNEY Patented Apr. 15, 1952

2,592,645

UNITED STATES PATENT OFFICE 2,592,645

MEANS FOR SEALING FLUID LUBRICANT IN THE HUB OF A ROTATING ELEMENT

Allan J. Kayser, Denver, Colo., assignor of fifty per cent to Maurice L. Kurland, forty per cent to Grace K. Israel, and ten per cent to Rosalind L. Kayser, all of Denver, Colo.

Application June 2, 1950, Serial No. 165,729

5 Claims. (Cl. 301—123)

This invention relates to a sealing device for sealing fluid lubricant in the hub of a rotating element, and while more particularly applicable for use on freely rotating vehicle wheels, such as used on trailers and the like, it is not limited to this particular use, but will be found valuable wherever it is desired to seal the hub of a rotating element.

Wheels of the freely rotating type, such as used on trailers and similar vehicles, have been heretofore lubricated with hard oil or axle grease, since it has been found impossible to retain fluid oil therein. The principal object of this invention is to provide a wheel seal which will enable fluid oil to be used for wheel lubrication, and which will prevent leakage and loss of the oil.

Another object of the invention is to so construct the improved sealing device that it can be applied to the present conventional wheels without change in the construction thereof.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is an inside face view of a sealing ring structure employed in the invention;

Fig. 2 is an outside face view of the improved sealing ring structure of Fig. 1;

Fig. 3 is an enlarged cross-section, taken on the line 3—3, Fig. 1; and

Fig. 4 is a cross-section through a conventional wheel hub, illustrating the invention in place thereon.

In Fig. 4 typical parts of a wheel mounting are designated by numeral as follows: axle 10, wheel 11, hubs 12, outer bearing 13, inner bearing 14, bearing stop flange 15, and wheel-retaining nut 16.

In the usual assembly the inner bearing 14 is clamped against the stop flange 15 by the retaining nut 16. In applying this invention to the wheel, a metallic spacing ring 17 is clamped between the inner bearing 14 and the flange 15 by the nut 16. A hub cap 18 is secured over the nut 16 by means of cap screws 19 threaded into the outer hub 12. A sealing gasket 20 is positioned between the hub and the cap 18 to prevent leakage therearound.

A tapped filling opening is formed at the axis of the cap 18 and closed by a suitable threaded plug 21. A small breather opening 22 is formed through the plug 21 to accommodate expansion and contraction of the air within the hub due to temperature changes therein. In use, the hub is partially filled with fluid lubricant, as indicated at 23.

The hub is sealed at its inner extremity by means of an outer resilient, compressible ring 24 and an inner resilient, compressible ring 25. The rings are formed from any suitable non-metallic material, such as tread stock rubber, neoprene, or the like. Both rings 24 and 25 are of unusual cross-sectional construction.

The outer peripheral surface of the ring 24 contains a plurality of flat, tapered grooves which form a series of spaced-apart, wedge-shaped ridges 26, which, when the ring is installed, bear against the inner surface of the inner hub 12 to prevent leakage between the hub and the ring 24.

The inner edge of the ring 24 is beveled back, as shown at 27, to form a sharp, flexible edge 28 which, when the ring is installed, bears flexibly against the outer race of the inner bearing 14 to accommodate any irregularities in the placement of the latter and to force the entire ring 24 resiliently outward.

The inner cylindrical surface of the ring 24 is beveled inwardly, and the outer face of the ring is grooved, as shown at 29, to form a relatively thin, flexible, conical skirt 30 which projects inwardly from the inner cylindrical surface and outwardly from the outer face of the ring 24. The edge of the skirt 30 is beveled on both sides to form a relatively sharp edge 31 which is V-shaped in cross-section.

A peripheral flange 32 projects outwardly about the outer face of the metallic ring 17 to substantially the inner diameter of the inner hub 12. The ring 24 is designed to surround the ring 17 with the outer beveled face of the edge 31 lying resiliently against the flange 32.

A relatively thin, flexible annular lip 33 projects outward from the outer face of the ring 24 into resilient contact with the flange 32 adjacent the periphery of the latter.

Lubricating fluid is prevented from escaping between the hub 12 and the ring 24 by the plurality of dams formed by the wedge-shaped ridges 26 compressed against the internal surface of the hub 12. Fluid is prevented from escaping between the ring 17 and the ring 24 by the thin sharp edge 31 of the skirt 30 which bears resiliently against the flange 32.

It is desired to call attention to the fact that the ring 17 is held stationary by means of a key pin 34 which projects from the ring 17 into a notch 35 formed in the flange 15, and that the thin feather edge 31 of the ring 24 rotates against the stationary flange 32. This produces an unusual result which results in a leak-proof seal even after long, continuous use. This unusual efficiency may be due to the fact that fluid approaching the edge 31 is immediately put in motion by the traveling edge. This creates an instant centrifugal effect which throws the fluid outward against the inner conical surfaces of the ring 24 and back into the hub before it has an opportunity to seep between the edge 31 and the flange 32. It will also be noted that both surfaces of the flange 32 and the edge 31 become worn into perfect contact with use, so that long use only increases efficiency.

The lubricating fluid is prevented from escaping between the axle 10 and the ring 17 by the ring 25. The latter ring has a substantially circular inner contour in cross-section which fits into a round-bottomed groove 36 formed in a beveled inner corner face 37 on the ring 17. The ring 25 has a circular outer contour in cross-section of larger radius than the inner contour, which fits against the filet of the axle flange 15. The difference in radii between the inner and outer contours of the ring 25 provides two projecting fins 38 which lie against the beveled corner face 37 of the ring 17. This provides an absolute seal between the axle and the metallic ring 17. There is no leakage through the breather hole 22, since the lubricating fluid is always thrown outwardly in the hub by centrifugal action when the wheel is rotating, and always flows back into the bottom of the hub when the wheel is standing still.

The relatively thin, flexible, annular fin or lip 33 projects outwardly from the outer face of the ring 24 into light frictional contact with the flange 32 adjacent the periphery of the latter. This fin or lip is simply for the purpose of resisting the entrance of foreign materials, such as water, mud, dust, etc., into the groove 29.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A sealing device for sealing a wheel hub to an axle, comprising: a stationary metallic ring adapted to fit over an axle at the inner face of a hub; an annular, peripheral flange surrounding and projecting radially outward from said ring to substantially close the inner end of said hub; a resilient ring having an external cylindrical surface lying against, and rotating with, the inner surface of said hub; and a flaring resilient skirt on the inside of said resilient ring extending inward toward said metallic ring and outward into resilient contact with said flange.

2. A sealing device for sealing a wheel hub to an axle, comprising: a stationary metallic ring adapted to fit over an axle at the inner face of a hub; an annular, peripheral flange surrounding and projecting radially outward from said ring to substantially close the inner end of said hub; a resilient ring having an external cylindrical surface lying against, and rotating with, the inner surface of said hub; a flaring resilient skirt on the inside of said resilient ring extending inward toward said metallic ring and outward into resilient contact with said flange; a tapered, wedge-shaped inner extremity on said skirt; and a relatively thin, sharp inner edge formed on said inner extremity and lying against said flange so as to remove outwardly moving fluid from said flange.

3. A sealing device for sealing a wheel hub to an axle, comprising: a stationary metallic ring adapted to fit over an axle at the inner face of a hub; an annular, peripheral flange surrounding and projecting radially outward from said ring to substantially close the inner end of said hub; a resilient ring having an external cylindrical surface lying against, and rotating with, the inner surface of said hub; a flaring resilient skirt on the inside of said resilient ring extending inward toward said metallic ring and outward into resilient contact with said flange; and a plurality of parallel, circumferentially extending ridges formed on the external cylindrical surface of said resilient ring and contacting the inner surface of said hub.

4. A sealing device for sealing a wheel hub to an axle, comprising: a stationary metallic ring adapted to fit over an axle at the inner face of a hub; an annular, peripheral flange surrounding and projecting radially outward from said ring to substantially close the inner end of said hub; a resilient ring having an external cylindrical surface lying against, and rotating with, the inner surface of said hub; a flaring resilient skirt on the inside of said resilient ring extending inward toward said metallic ring and outward into resilient contact with said flange; a tapered, wedge-shaped inner extremity on said skirt; a relatively thin, sharp inner edge formed on said inner extremity and lying against said flange so as to remove outwardly moving fluid from said flange; and a beveled inner edge on said resilient ring forming a relatively sharp terminus edge in contact with the inner surface of said hub.

5. A sealing device for sealing a wheel hub to an axle, comprising: a stationary metallic ring fitting over an axle at the inner face of a hub; an annular, peripheral flange surrounding and projecting radially outward from said ring to substantially close the inner end of said hub; a resilient ring having an external cylindrical surface lying against, and rotating with, the inner surface of said hub; a flaring resilient skirt on the inside of said resilient ring extending inward toward said metallic ring and outward into resilient contact with said flange; and a second annular, resilient sealing ring positioned between said metallic ring and said axle.

ALLAN J. KAYSER.

REFERENCES CITED

The following references are of record in the file of this patent:

UNITED STATES PATENTS

| Number | Name | Date |
|---|---|---|
| 1,437,833 | Buckwalter | Dec. 5, 1922 |
| 2,076,218 | Alden | Apr. 6, 1937 |
| 2,132,249 | Van Velt | Oct. 4, 1938 |
| 2,250,348 | Beier | July 22, 1941 |
| 2,254,198 | Ash | Sept. 2, 1941 |
| 2,391,007 | Buckendale | Dec. 18, 1945 |
| 2,512,148 | Gaines | June 20, 1950 |

FOREIGN PATENTS

| Number | Country | Date |
|---|---|---|
| 52,673 | Netherlands | June 15, 1942 |
| 263,728 | Italy | Mar. 28, 1929 |